(No Model.)
W. J. GROTENHUIS & H. T. SIDWAY.
BISCUIT CUTTER.
No. 504,834. Patented Sept. 12, 1893.
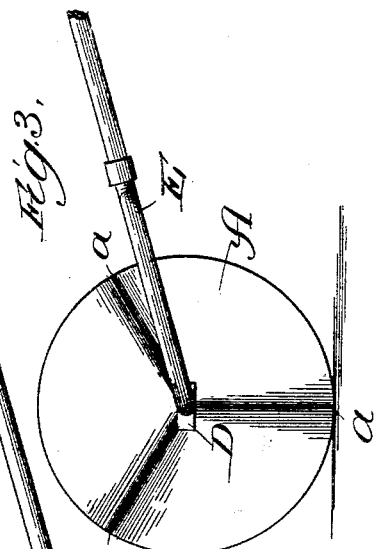
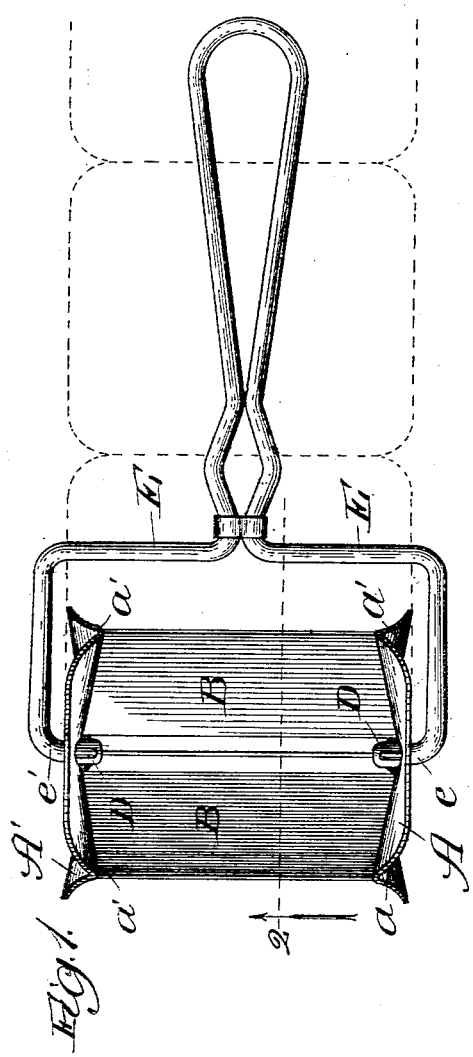
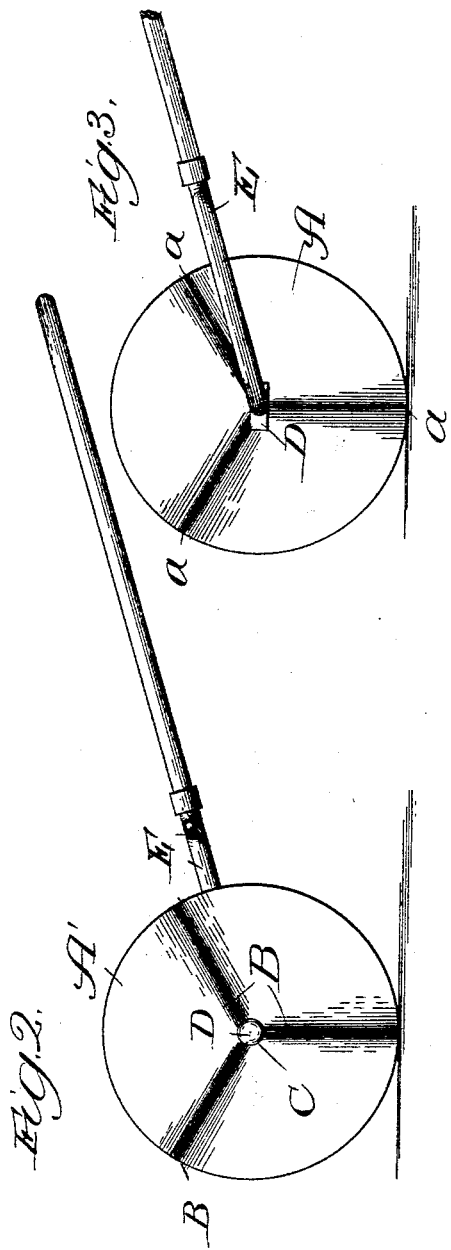
Witnesses:
Chas. E. Gaylord.
Clifford N. White.
Inventors:
Henry T. Sidway,
William J. Grotenhuis,
By Banning & Banning & Payson,
Attys.

UNITED STATES PATENT OFFICE.

WILLIAM J. GROTENHUIS AND HENRY T. SIDWAY, OF CHICAGO, ILLINOIS, ASSIGNORS, BY MESNE ASSIGNMENTS, TO THE SIDWAY MANUFACTURING COMPANY, OF SAME PLACE.

BISCUIT-CUTTER.

SPECIFICATION forming part of Letters Patent No. 504,834, dated September 12, 1893.

Application filed June 28, 1892. Serial No. 438,284. (No model.)

*To all whom it may concern:*

Be it known that we, WILLIAM J. GROTENHUIS and HENRY T. SIDWAY, of Chicago, Cook county, Illinois, have invented certain new and useful Improvements in Biscuit-Cutters, of which the following is a specification.

The object of our invention is to provide an easily operated cutter adapted to revolve in a suitable handle, and which is preferably so constructed as to cut three biscuits at each revolution of the cutter, these biscuits being preferably, though not necessarily, in the form of a rectangle having rounded corners.

While we have termed our invention in the specification and claims a "biscuit cutter" and described its use as such, it should be understood that we do not intend to limit ourselves to this use alone, but contemplate employing it to cut biscuit, cake, or dough in any form, as well as any other material which it is adapted to cut and capable of cutting, and shall only use the word "biscuit" for the sake of simplicity and to avoid unnecessary repetition, there being no one word that will satisfactorily cover all of the uses to which our cutter can be applied.

Our invention consists in the features, details of construction, and combinations hereinafter described and claimed.

In the drawings, Figure 1 is a plan view of a cutter made in accordance with our invention; Fig. 2 a section on line 2 of Fig. 1, looking in the direction of the arrow; and Fig. 3 a side elevation.

The cutter may be constructed out of tin or any other suitable material. We first make two substantially circular disks A, A', of any desired diameter, and preferably, though not necessarily, provided with any desired number of flutes or corrugations $a, a'$. These disks are connected by flat cutting blades B, B, which, when the disks are fluted or corrugated, run across and are attached to the corrugated portions of the disks, as shown more particularly in Fig. 1. These cutting blades extend from substantially the circumference of the disk in toward the center, but do not meet at such center, whereby an open space is left between the inner edges of the blades, which is of great advantage, in that it facilitates the escape of air and renders it more easy to cut deeply, since if these blades did meet, a closed pocket would be formed in which the air would be compressed in using the cutter. The disks are further provided with holes, C, located substantially at their centers, and into these holes may be inserted what we term "journal caps" D.

The handle E is made preferably of wire, bent in the form shown, and with its ends $e$, which are preferably though not necessarily turned down, inserted into the journal caps. From this construction it will be evident that the handle may be very readily applied to and removed from the cutter, and that the cutter when attached to the handle will revolve readily thereon.

In use the cutter is pressed against the dough, pastry, or other material to be cut, and moved by its handle over the same. This causes the cutter to revolve, cutting out substantially rectangular biscuit with rounded corners, as indicated by dotted lines in the first figure of the drawings; three of these biscuit being formed at each revolution of the cutter, when made in the form shown. In this way, any number of biscuit may be cut at a single operation or stroke, depending simply upon the amount of dough or other material out of which the biscuit are to be cut.

In the drawings we have shown the cutter as adapted to make rectangular biscuit with rounded corners, but, if desired, the biscuit can be made rectangular without such rounded corners, by making the disks A A flat, instead of corrugated.

While we have described more or less precise forms, we do not intend to limit ourselves unduly thereto, but contemplate changes in form, proportion, and the substitution of equivalent members as may be desirable or necessary. Moreover, this cutter may be operated by hand or by power, and the form of the handle may be changed as desired.

We claim—

1. A cutter comprising two disks, straight cutting blades secured to such disks and forming the sole means of connection between them, and a handle rotatably secured to the disks, substantially as described.

2. A cutter comprising two disks, straight cutting blades connecting such disks, an opening being left between the inner edges of such blades, and a handle rotatably secured to the disks, substantially as described.

3. A biscuit cutter comprising two corrugated disks, cutting blades connecting such disks with an opening at their inner edges, and a handle rotatably secured to the disks, substantially as described.

4. A biscuit cutter comprising two corrugated disks, cutting blades connecting the disks and secured to the corrugations, and a handle rotatably secured to the disks, whereby as the cutter is revolved over the material to be cut, rectangular round cornered biscuit will be formed, substantially as described.

WILLIAM J. GROTENHUIS.
HENRY T. SIDWAY.

Witnesses:
GEORGE S. PAYSON,
SAMUEL E. HIBBEN.